United States Patent [19]
Bhandari et al.

[11] Patent Number: 5,566,177
[45] Date of Patent: Oct. 15, 1996

[54] PRIORITY-BASED ARBITRATOR ON A TOKEN-BASED COMMUNICATION MEDIUM

[75] Inventors: Inderpal S. Bhandari, Scarsdale, N.Y.; Alexander G. MacInnis, San Carlos, Calif.; Ragunathan Rajkumar, Monroeville, Pa.

[73] Assignee: International Business Machines Corporation, Armonk, N.Y.

[21] Appl. No.: 320,462

[22] Filed: Oct. 9, 1994

[51] Int. Cl.$^6$ .................................................. H04L 12/433
[52] U.S. Cl. .................... 370/85.5; 370/85.6; 395/200.21
[58] Field of Search .................................. 370/85.1, 85.2, 370/85.4, 85.5, 85.6, 85.11, 85.12, 85.7, 85.8; 340/825.05, 825.5, 825.51; 395/200.21

[56] References Cited

U.S. PATENT DOCUMENTS

| | | | |
|---|---|---|---|
| 4,445,116 | 4/1984 | Grow | 370/85.6 |
| 4,566,097 | 1/1986 | Bederman | 370/85.6 |
| 4,627,051 | 12/1986 | Shimizu | 340/825.5 |
| 4,669,079 | 5/1987 | Blum | 340/825.5 |
| 4,680,757 | 7/1987 | Murakami et al. | 370/85.6 |
| 4,726,018 | 2/1988 | Bux et al. | 340/825.5 |
| 4,799,052 | 1/1989 | Near et al. | 340/825.5 |
| 4,819,229 | 4/1989 | Pritty et al. | 340/825.5 |
| 4,930,121 | 5/1990 | Shiobara | 370/85.4 |
| 4,943,959 | 7/1990 | Arnold | 370/85.5 |
| 5,051,986 | 9/1991 | Grow et al. | 370/85.5 |
| 5,077,733 | 12/1991 | Whipple | 370/85.6 |
| 5,119,374 | 6/1992 | Firoozmand et al. | 370/85.4 |
| 5,132,966 | 7/1992 | Hayano et al. | 370/85.6 |
| 5,140,584 | 8/1992 | Suzuki | 370/60 |

OTHER PUBLICATIONS

TR-43.920, Dec. 1991, p. 53, R. Nagarajan et al.: "Guaranteed Performance Transport of Multimedia Traffic Over the Token Ring".

IBM Technical Disclosure Bulletin, vol. 33, No. 2, Jul. 1990, pp. 325–331; G. L. Guthrie et al.: 1-Bit Token Ring Arbitration Protocol/Scheme.

*Primary Examiner*—Douglas W. Olms
*Assistant Examiner*—Chau T. Nguyen
*Attorney, Agent, or Firm*—Douglas W. Cameron

[57] ABSTRACT

This invention is an arbitration scheme for a token-based communications medium which is intended for use when there are timing deadlines for transactions on the medium. Initially knowledge of the expected workload is used to determine for each module its priority as well as the limit on the duration of time lower priority modules can be permitted to use the medium between request and completion of a transaction for this module. A count is maintained for each module of the number of data units that has been transferred on the medium by lower priority modules since the time this module last requested the medium. A module can transmit a selected number of data units if it has the token and the count of none of its higher priority modules has reached a corresponding limit.

8 Claims, 6 Drawing Sheets

PRIORITY-BASED ARBITRATOR ON A TOKEN-BASED COMMUNICATION MEDIUM

TECHNICAL FIELD

This invention relates to an arbitration scheme on a token-based communications medium where there are tinting deadlines for transactions on the medium.

DESCRIPTION OF THE PRIOR ART

Appropriate scheduling of communication medium transactions is essential to ensure that the timing behavior of the media traffic is predictable. The goal is to guarantee the response time (time from when a transaction becomes ready to transmit to the time when the transaction is actually completed.) In static priority scheduling algorithms, each transaction type from a module is assigned a static priority, and during any given arbitration, the transaction with the highest assigned priority requiring the medium becomes the master. In the current state of the art, this priority arbitration of modules on a bus is achieved by using a dedicated set of arbitration lines and either a central bus arbiter or a distributed arbiter. These arbitration lines are used to compare the priorities of competing modules directly, and consume up to 400 ns overhead. Having a set of dedicated arbitration lines consuming 400 ns of bus bandwidth can be prohibitive in many applications.

There is, therefore, a need to reduce this overhead.

SUMMARY OF THE INVENTION

It is, therefore, an object of this invention to reduce overhead involved in having dedicated arbitrations lines.

Accordingly, this invention provides a method and apparatus for arbitrating access to a token-based communications medium among a plurality of modules, where each of the modules has a limit on the time between a request for transfer of a unit of data and transfer of the unit of data on the medium. With this invention, a count is maintained for each module of the number of data units transferred by lower priority modules on the medium. A module will transmit at least a unit of data if it has a token and the count of none of the higher priority modules has reached a corresponding limit.

DESCRIPTION OF THE PREFERRED EMBODIMENT

Figure 1:
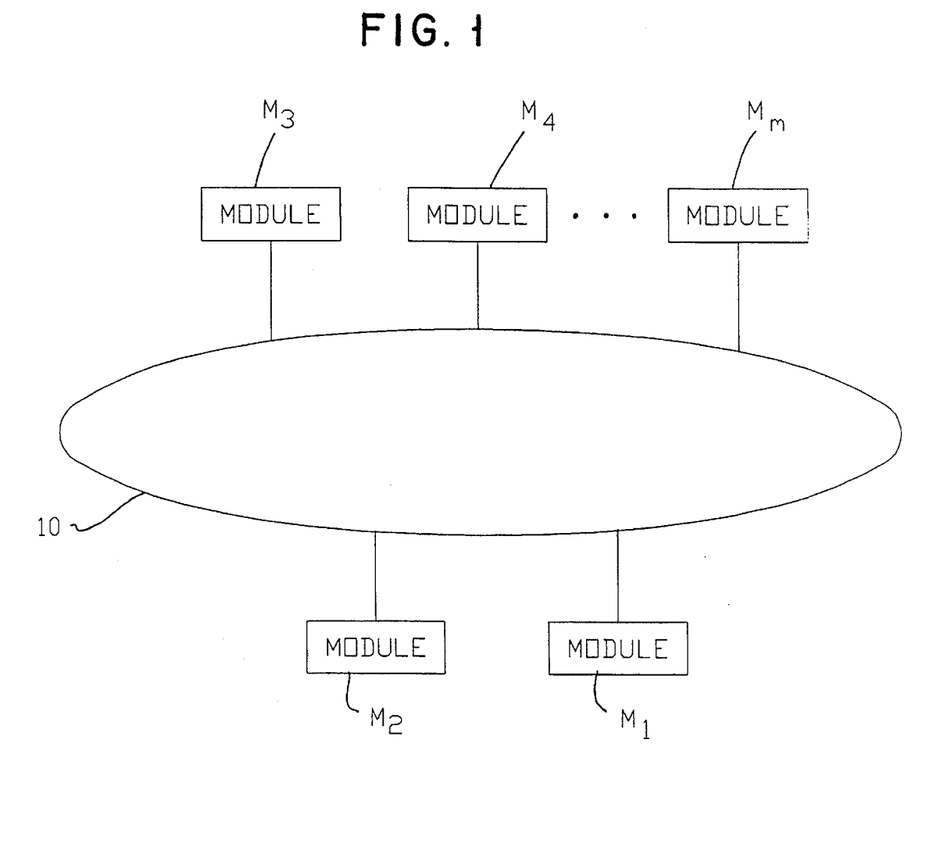
FIG. 1 schematically illustrates the network topology in which the invention is utilized.

Shown in FIG. 1 is the overall communications medium 10 on which the invention is implemented. Also, modules $M_1$ through $M_n$ are shown as being connected to medium. Access to the medium is controlled by a token which circulates between the modules on the medium.

Terminology[1]

A module is said to become the CM master (or just master) when it wins arbitration and can initiate transactions on the communication medium.

[1] A module i is denoted by $M_i$

A CM transaction (or just transaction) consists of one or more actions taken on the communication medium by a module after becoming the CM master. The term action refers to the transmission of a single unit of data. A unit of data is a selected number of packets, where the number is based on the traffic on the communication medium. For the sake of simplicity one packet is defined as one unit of data.

The communication medium is said to be used if a module becomes the master and initiates a single data transaction. If a module initiates n transactions, it is said to have used the communication medium n times. For the purposes of this application, transmission of tokens does not constitute use of the communication medium.

A module is said to be requesting the communication medium if it has data to be transferred.

Assumptions

1. A communication medium (CM) 10, e.g. a bus or a ring, connects several modules $M_1$ through $M_n$ which need to communicate with one another. The modules transfer data such as digital video and audio. These modules may or may not be on a physical board or box.

2. At most one single module can transfer data on the communication medium 10 at any given time.

3. Each module is assigned a static priority that is known a priori. This priority is assigned/picked at initialization time or later as part of a reconfiguration procedure by some set of entities such as a processor.

Such assignment does not completely preclude dynamic module priorities or multiple requests with different priorities from the same module. If the priority of a module changes, the priorities can simply be reassigned (reinitialized). If there are multiple requests with different priorities on a module, the module is assigned a priority equal to the highest priority of its requests.

4. Each module has a set of transactions that need to use the communication medium 10. If a module $M_i$ wants to initiate a transaction, it participates in an arbitration and must first become a CM-master (defined above). The arbitration is based on a token-passing mechanism: a token is circulated among the modules, and a module can become CM master only if it has the token. Having the token is a necessary but not a sufficient condition to become the CM-master.

5. Each token has an intended destination, either implicit or explicit. The destination is explicit if the token is addressable to any module on the communication medium. The destination is implicit if the token must pass through a pre-defined sequence of modules.

6. There exists an upper bound on the maximum length of a single medium transaction.

Figure 2:
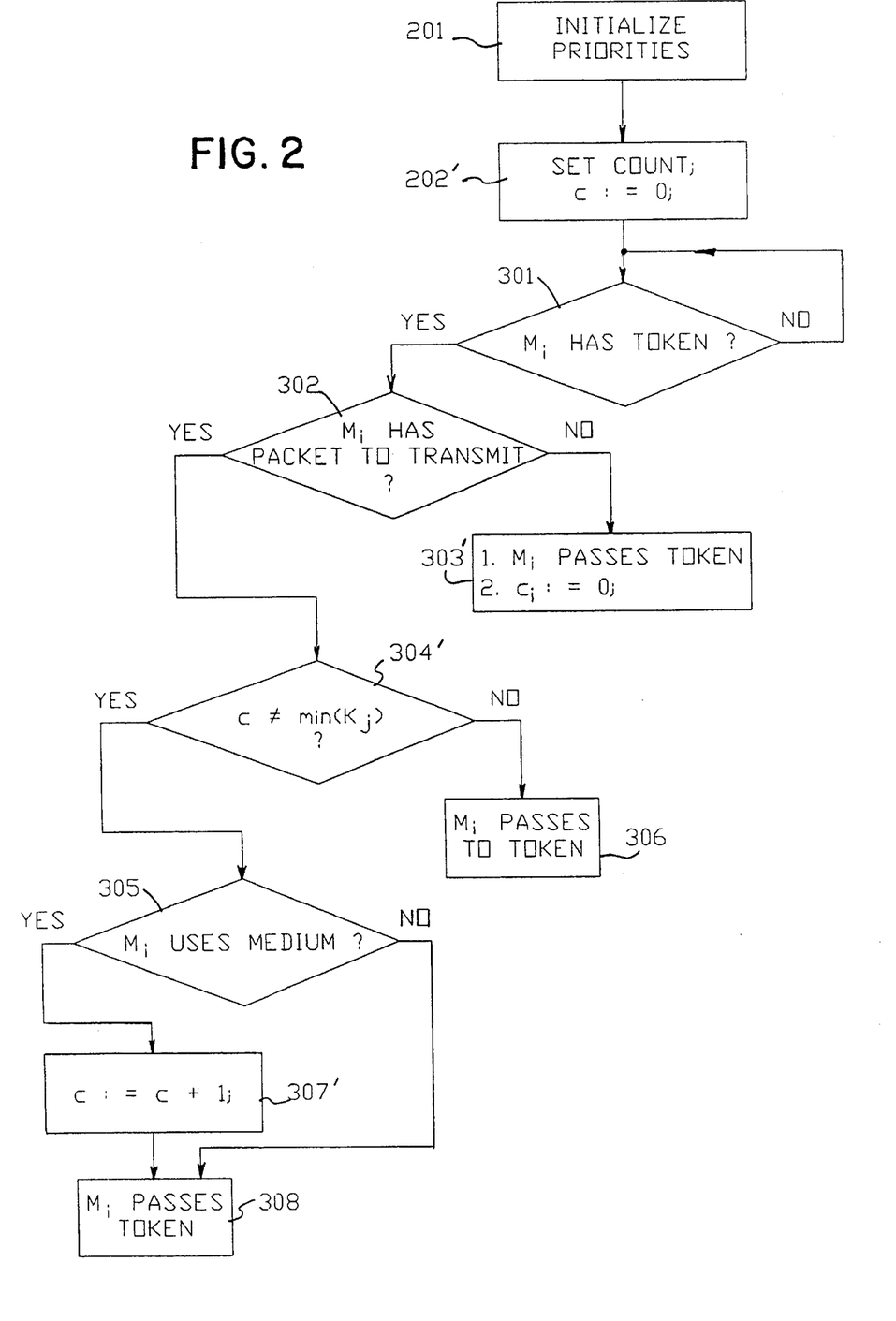
FIG. 2 is a flow chart describing the arbitration access to a token-based communications medium used by this invention.

Referring to FIG. 2 this invention supports priority-based arbitration on a token-based communication medium. The method for implementing this invention is described by the flow chart in FIG. 2. The flow chart comprises user-definable parameters and computing rules as described below.

Given: A set of parameters $k_i, i=1, \ldots, m$, where $k_i$ is a positive number $\geq 1$, where $k_i$ represents the number of transactions permitted by modules having a priority lower than $M_i$ after $M_i$ has requested the medium.

1. Priority Ordering: The modules are sorted in non-ascending order of module priorities. For notational convenience, let module $M_i$ have higher priority than module $M_{i+1}$ in this ordering (201).

2. Count: A count $c_i$ is maintained For each module $M_i$. Initially, each $c_i$ is set to zero (202).

3. Decision-Making Rule: A module $M_i$ is eligible to use the communication medium if the following three conditions are satisfied: 305, 306

The module has the token 301.

The module is requesting the communication medium 302. If $M_i$ gives up the token because it is not requesting the medium, $c_i$ is reset 303.

CM-use rule: For every $j<i$, there have been less than $k_j$ updates to $c_j$ since its last reset 304.

4. Bypassing Rule: A module $M_i$ eligible to use the medium according to the decision making rule will either use the medium or pass the token to another module $M_j$ 305.

5. Count Maintenance Rule: A module $M_i$ eligible to use the communication medium according to the decision-making rule cars either use the medium or pass the token to another $M_j$. For every use of the medium by a module $M_i$, $c_j$ is updated once for every $j<i$ 307.

Described below are the various specific implementations of the algorithm described in the flow chart in FIG. 2.

This invention permits a large class of possible implementations by introducing minor variations in the three rules in the algorithm in FIG. 2: Count Maintenance Rule, Bypassing Rule, and Decision Making Rule. Optimized implementations can be obtained by confining the design space of the rules as follows.

Strict Rule: The bypassing rule can always be trivially satisfied by letting a module use the medium whenever the decision-making rule is satisfied. This saves the overhead of passing the token to other modules which may or may not be requesting the medium. Under the strict rule, a module does not pass the token if it is requesting the medium and the CM-use rule is satisfied. The module passes the token if and only if it is not requesting the medium and/or the CM-use rule is not satisfied. With the strict rule, $M_i$ always opts to use the medium (305), and never passes the token until after it uses the medium (307–308).

Token-passing Rule: When a token must be passed, the token-passing sequence can be optimized in two steps to work efficiently with the strict rule:

Sequencing Rule: If the CM-use rule is satisfied, the token is always passed from module $M_i$ to module $M_{i+1}$[2] Decision box 308 would be changed to: "$M_i$ passes token to $M_{i+1}$".

[2] The last module passes the token back to module $M_1$

If the CM-use rule is not satisfied, then $c_j=k_j$ for some $j<i$. This means that the CM-use rule will not be satisfied at any other module with lower priority than $M_j$. Hence, the module can either pass the token directly to module $M_{j_{min}}$ (where $j_{min}$ corresponds to the smallest j satisfying $c_j=k_j$. Action box 306 is changed to: "$M_i$ passes token to $M_{j_{min}}$".), or it can pass the token indirectly using one of the two options below.

a. Trickle-Down Option: If module $M_i$ needs to pass the token to module $M_j$, the token is passed to any higher priority module $M_q$ where $q<j$. The sequencing rule ensures that $M_j$ will receive the token before $M_p$ where $p>j$. The simplest trickle-down option is that whenever the CM-use rule is not satisfied, a module passes the token to the highest priority module, $M_1$.

b. Indirect Relay Option: If a module $M_i$ needs to pass the token to module $M_j$, it passes the token to $M_{i+1}$ but indicates that only module $M_q$ where $q<j$, can use the token. The simplest relay option is to indicate that the highest priority module $M_1$ can use the token.

Figure 3:
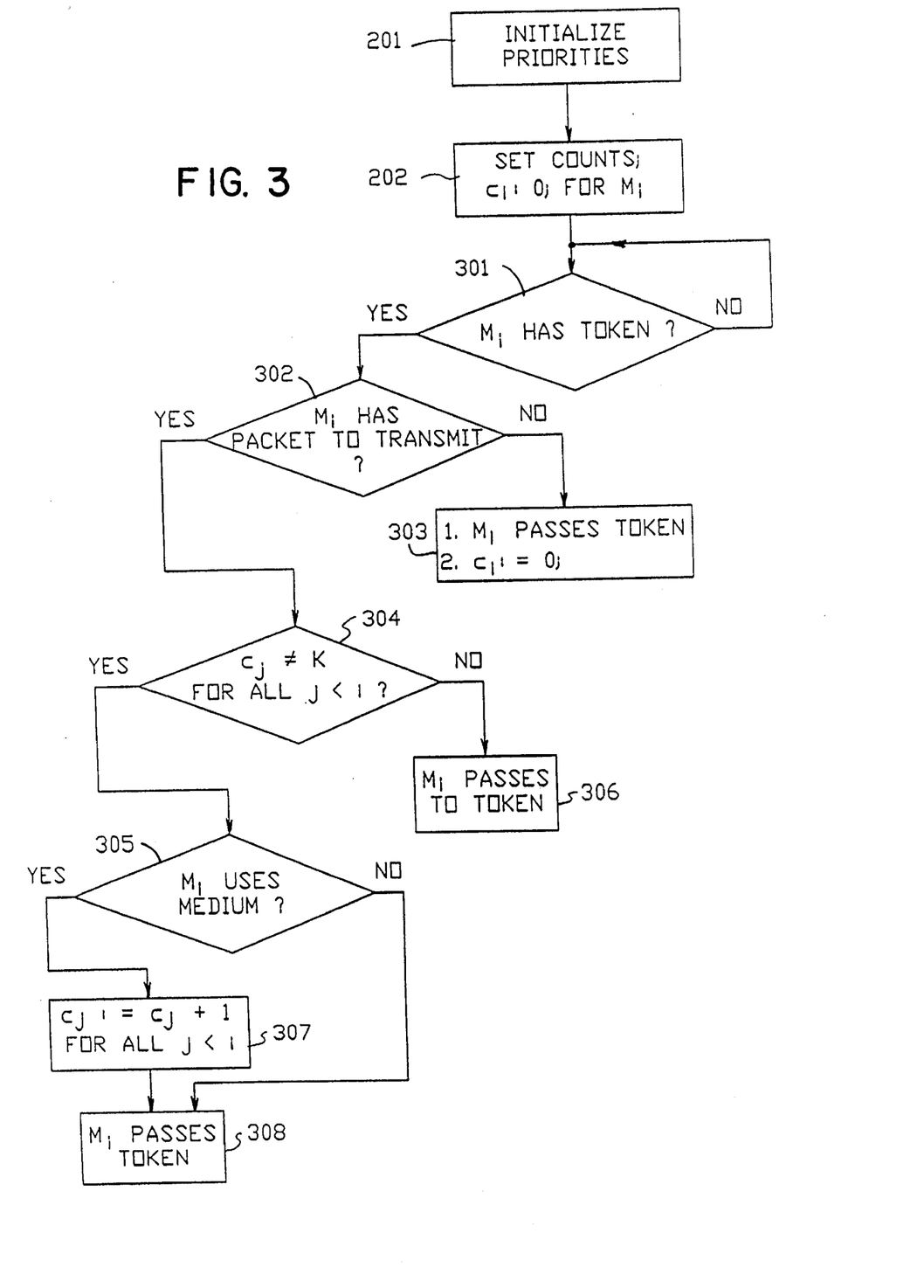
FIG. 3 is a flowchart showing how the count maintenance rule can be optimized.

Count Optimization: The count maintenance rule can be optimized as follows. A single count c is maintained, and whenever any module uses the medium, the count c is incremented by 1. The count c is reset to 0 whenever the highest priority module releases the token. To achieve this optimization, the changes to the flow diagram of FIG. 2 are reflected in FIG. 3. 202', 303'–304', and 307' in FIG. 3 show the changes from FIG. 2. All other boxes in the flow diagram of FIG. 3 are identical to those in FIG. 2.

Hardware Configuration for Preferred Implementation

Figure 4:
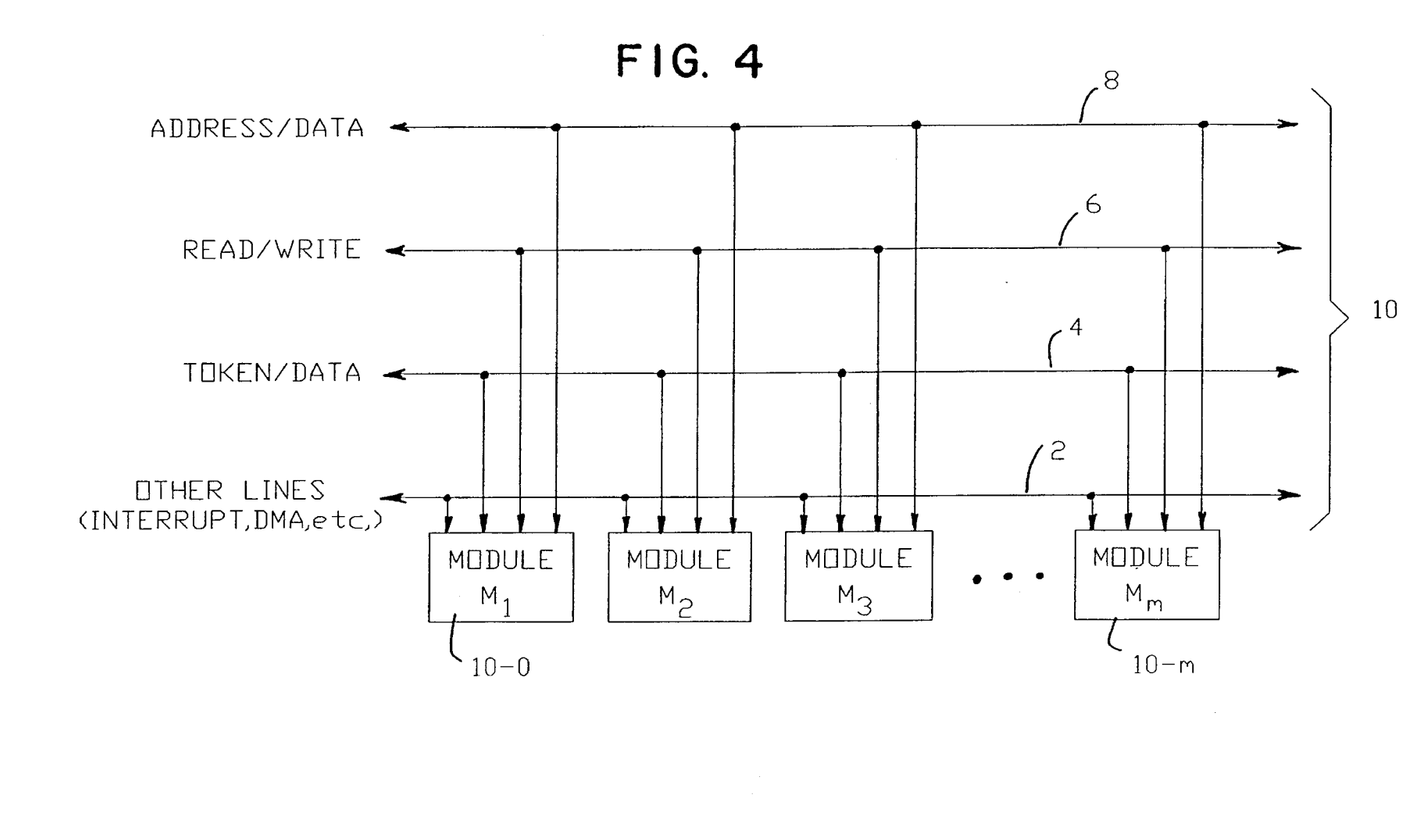
FIG. 4 schematically illustrates a token bus (or token ring) and its connections to the modules.

Referring to FIG. 4, a broadcast bus 10 is used to allow for explicit addressing and quick transmission of tokens. This means that a signal transmitted by one module $M_i$ can be simultaneously read by all the modules on the bus.

In this embodiment, we shall assume that the token is not transmitted concurrently with data transfers. In other words, either a data transfer or a token transfer can take place during a bus transaction but not both.

Each module has a register in which its id can be set either at initialization time or by a dynamic configuration procedure. See description of FIG. 5.

Fixed data transfers on the bus are preferable but not necessary.

The destination for a token transfer is explicit so that transfers are fast and no routing is done.

Rules Used in Embodiment

If a module can use the bus and has a pending message, it transfers the message instead of passing the token. See Strict Rule above.

There is a node designated as the leader which is used for for maintenance and control purposes (described below), and need not be a node that transfers data.

Every module maintains its next neighbor in the token bus. The last module keeps the leader node as its neighbor. Every module also knows who the leader module is. See description of FIG. 5 below.

The count fields in the token are eliminated by snooping token transfers on the bus. Token transfers alone are snooped. Any operation other than token transfer is assumed to be from the last token recipient.

When a count $c_j$ reaches $k_j$ for a higher priority module $M_j$, the token is passed to the leader module 306.

For the sake of implementation convenience, we assume that address 0 corresponds to the leader and that the highest module address corresponds to a broadcast.

FIG. 4 gives a desired physical embodiment of a token-ring communication medium 10 which implements the priority scheme described in this invention. The communication medium is a data bus to which multiple modules are connected such that the bus signals can be sensed by every module on the bus. For the purposes of this description, we assume that the bus consists of multiplexed address/data line 8, a read/write signal line 6, a token/data signal line 4, as well as other lines 2 to support features such as interrupts, DMA support, split transactions, synchronous/asynchronous operations etc.

Address/Data Multiplexing: At any given time, at most one bus module can transmit on the bus. A bus module must obtain bus tenure before it can transmit on the bus. The address/data multiplexing is done as on a normal bus. During the beginning of a transaction, the address of the destination is issued along the address/data lines, and this destination address is latched by the various bus modules. The next operation depends upon the type of bus transaction requested by the requestor module. If the requested bus transaction is a read operation, the destination module place the contents of the specified address on the lines. If the requested bus transaction is a write operation, the destination module routes the data placed on the data line by the requestor to the specified address in its modules.

Token/Data Transfers: The token data line 4 indicates whether a message transaction involves a data transfer on the bus or a token transfer on the bus. During a token transfer, no (application-level) data is transferred. During a data transfer transaction, only (application-level) data is transferred. During token transfer, the address/data lines are used to indicate both the source and destination modules of the token transfer. This can be done either in a single cycle or in two cycles. Token transfer transactions are recorded by all modules.

Module Address Selection: A bus module can be selected simultaneously by a unique subset of the address and other signal lines. We adopt the convention that module 0 indicates the leader module of the bus which performs initialization and reconfiguration of the bus and module priorities. Similarly, the highest numbered module address is used to indicate that the corresponding bus transaction applies to all modules (i.e. a bus broadcast). These bus broadcast lines are especially useful during initialization.

Figure 5:
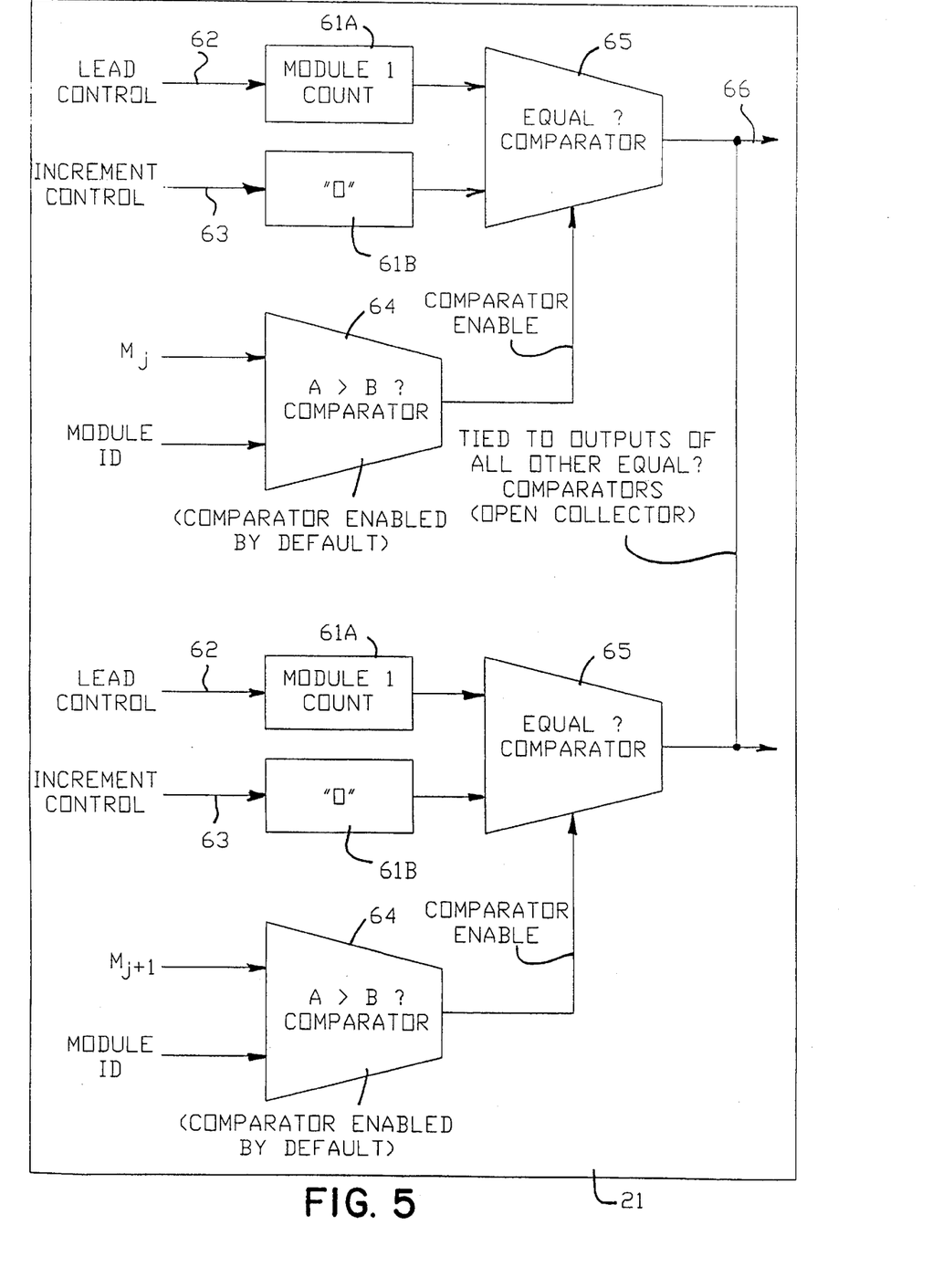
FIG. 5 is a schematic illustration of the modules modified according to the invention.

FIG. 5 illustrates the bus interface on each bus module. This interface consists of a set of 3 registers (bus leader 24, module id 26, id of next module 28), a count compare block 21, a token control block 22 and a usage control block 23[3]. Each of these blocks is described below:

[3]The rest of the module consists of other logic and buffers depending upon its nature and purpose.

Bus Leader Register: This register 24, contains the module address of the bus leader module. By default, this register will contain the address 0 as described above, and is the module to which the token will be transferred by the module when the CM-rule condition fails. See NO condition of decision box 304 of FIG. 2.

Module ID: This register 26 contains the module address of the module. This address must be guaranteed to be unique on the bus and is also selected such that a higher priority module's address has a smaller number than a lower priority module's address.

Next Module ID: This register 28 contains the module address of the logical neighbor module to which the module in question will transfer the token to if it has no data transfer to make and the CM-rule condition does not fail. See YES condition of decision box 304.

These 3 registers will be loaded during initialization to set the priorities of all the modules on the bus. As described earlier, the module IDs are assigned on the basis of priorities such that module i passes the token to module i+1 during simple token rotation. The last module returns the token to module 0.

Figure 6:
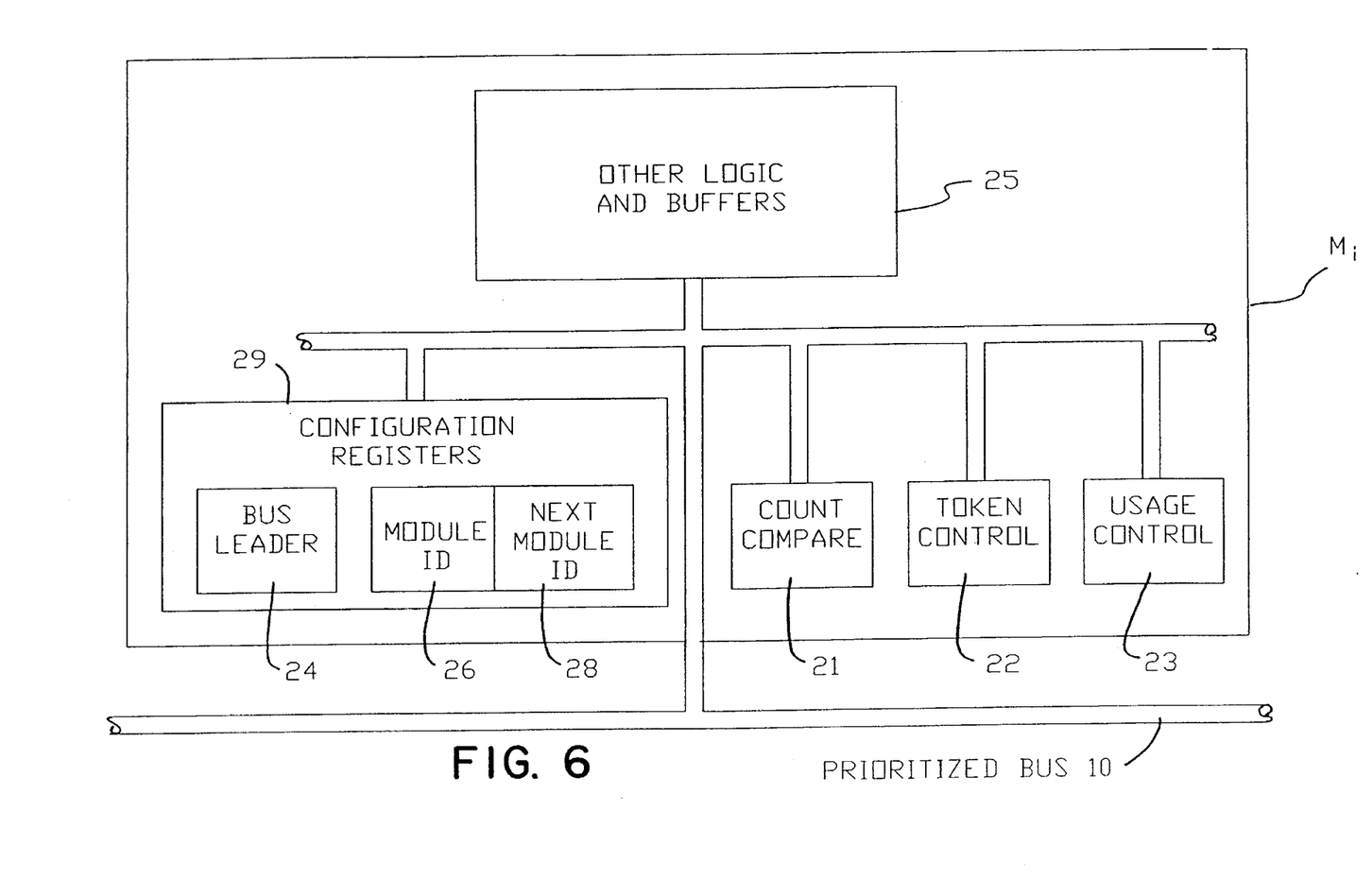
FIG. 6 is a graphic illustration of the count compare block in the modules modified according to this invention.

The Count Compare Block 21: The count compare block is illustrated in FIG. 6. It consists of n count registers 61 into which are initially loaded the values of $k_i$ for i=1 to n respectively. Each count register can be either loaded 62 individually or incremented 62 individually. This block is used to track the CM-use rule. If the count in any of the count registers corresponding to higher priority modules $M_j$ becomes $K_j$, it generates a signal. The A>B 64 comparator selects all the count registers of the modules with higher priority than this module. Comparator 65 determines whether any of these selected count registers currently has a value of $K_j$. One or more selected count registers must have a value of $K_j$ for the output 66 to become active. If the output becomes active, then the module will transfer a token in its possession to the leader module in the bus leader register. Whenever a bus module makes a data transfer on the bus, all count registers corresponding to modules with higher priority will be incremented by one (not shown in FIG. 6). Whenever the token is returned to the bus leader, all the count registers 61B are set to 0 for all i from 1 to n.

Token Control Block 22: On receiving a token, this block checks for any pending bus transaction requests on the module. If there are any pending requests and the output of the count compare block is not active, a bus transaction is initiated. This transaction will also increment the count registers in this module corresponding to those of higher priority modules. If there are no pending requests and the output of the count compare block is not active, then the token is passed to the next module id corresponding to the neighbor. If the output of the count compare block is active, the token is always returned to the bus leader and the count registers of all modules are reloaded. If the module does not have the token, this block tracks the current holder of the token by snooping on the bus transactions. Each data transfer transaction is associated with the last recipient of the token and is used to decrement the count registers corresponding to those modules with higher priority than the current token holder.

Usage Control Block: This block contains the logic to hold the pending requests for bus transfers in a queue with the requests being ordered in FIFO or priority fashion. When the module has the token and the output of the count compare block is inactive, the request at the head of the queue is processed and the appropriate bus signals are asserted Other Implementations We give below 4 other implementations of the invention. The implementations are efficient because they all use the strict and token-passing rules. Either the trickle-down option or the indirect relay option can be used within the token-passing rule. See FIG. 3 and explanation above. In the first two implementations, $\forall_i, k_i$ has an implicit value of 1. In the third implementation, $\forall_i, k_i$ is explicit and is the same value, k greater than 1. See FIG. 2 and previous explanation of $k_i$. In the final implementation, each $k_i$ is explicit and has a different value.

For convenience, we refer to the first module $M_1$ in the ordered set of modules as the leader.

All of the implementations described below require satisfaction of a first set of conditions before a module can transmit a unit of data on the medium. These first conditions are that the module has the token, the module has a request to transfer data on the medium, and a count of all of the modules having higher priority have not reached a corresponding limit. That is, there is a limit set for each module.

Implementation 1

Referring again to FIG. 5, in this implementation $\forall_i, k_i=1$, and the token-passing rule uses the simplest indirect relay option described herein. Count optimization is also applied.

Each token has one additional control bit, which takes the value FREE-TOKEN (say 0) or RELEASED-TOKEN (1). A token with its control bit set to FREE-TOKEN is called a free token, and a token with its control bit set to RELEASED-TOKEN is called a released token.

Each module interface to the medium consists of the following, and is illustrated in 20 in FIG. 5.

The leader register 24 indicates whether the module is the leader or not. At most one module can have this register set to be the leader.

The module is register 26 contains the id of the module.

The token sequence register (modified version to replace the NEXT MODULE ID 28) contains the ordered sequence corresponding to the current priority ordering in which the token is to be circulated. Since each module knows it own id, it knows where the token must normally be passed if it does not use the medium.[4]

[4]Alternatively, this register can contain the id of the module to which the token must be passed from this module.

The token-control mechanism 22 sets the token control-bit is set to FREE-TOKEN if the module did not use the medium, else is set to RELEASED-TOKEN.

The usage-control mechanism 23 decides whether the module becomes a master when a token is received. On receiving a token, a module becomes the master if the token is a free token and the module is requesting the transaction. If the received token is a release token, the module must pass it along unless it is the leader. If the module is the leader, it resets all received tokens to free tokens and can use the token immediately if it is requesting a transaction.

If a module decides to become the master, it can use the medium for only one transaction, at the end of which it generates a release token and passes it to the next module in the token sequence.

This implementation ensures that after every medium use, the highest priority module requesting the medium becomes the master.

Implementation 2

Implementation 2 is similar to Implementation 1 except that the token-passing rule uses the simplest trickle-down option.

Implementation 1 is based on the assumption that from a given module, a token can only be sent to one pre-specified module. If the token can be dynamically addressed to any of the bus modules, Implementation I can be modified such that a released token is always sent to the leader, which immediately resets it to a free token. This implementation requires that each module's bus interface know the id of the current leader.

This implementation has two significant advantages over Implementation 1.

1. If the number of modules is relatively large, the time required for the token to traverse the token sequence to reach the leader can be saved. This savings in time can result in substantial reduction in overhead.

2. In this implementation, each module locally decides whether the token must be passed to the next lower priority master[5] or to the leader directly. As a result, the token control-bit which says whether the token is a Free Token or a Released Token can be eliminated. This in turn can be used to implement an upward-compatible priority arbitration scheme on existing token-based buses.

[5]The lowest priority master always passes the token to the leader.

Implementation 3

Implementation 1 and 2 have $k_i=1$, for all values of i, and a module can use the bus for at most a single transaction for each token. Implementation 3 allows $\forall_i, k_i=k>1$, and a module can potentially use the bus more than once with a token.

Define an m-bit field called the count-field where $2^m \leq k$, and append this field to the token. On receiving a token, the leader always resets this field to k. A module with a token is allowed to use the medium if the count in the count-field is less than k. After each use of the medium, a module increments this field by 1. A module with the token continues to use the medium as long as the count is less than k and is requesting the bus. If it is no longer requesting the bus or the count is k, the module must pass the token. If the token must be passed, it uses one of two options:

Module $M_i$ always passes the token to module $M_{i+1}$. This is the indirect relay option.

(OR)

If the count in the token is greater than 0, module $M_1$. This is analogous to Implementation 2.

Modules using either of the above two options for token-passing can be intermixed on the same bus.

Eliminating the "Count Field" from the token: The count-field can also be eliminated from the token if all modules (a) know the id of the leader (b) know when the leader receives the token and (c) know that the medium is being used by some module other than the leader. These conditions can easily be snooped by modules in a token-bus where all modules have access to all bus pins. In this case, each module maintains an internal "count". Whenever the bus is being used by some module other than the leader, each module locally increments the count. When the token is sent to the leader, all modules reset the "count" to 0. The rest of the implementation remains the same.

Implementation 4

Implementations 1 and 2, $k_i=1$ for all values of i, and implementation 3 allows for all values of i, $k_i=k>1$. Implementation 4 allows $k_i \neq k_j, i \neq j$.

For each module $M_i$, define an $m_i$-bit field called the $i^{th}$ count-field where $2^{m_i} \leq k_i$, and append this field to the token. The count in the $i^{th}$ count-field is denoted by $c_i$ On receiving the token, a module $M_i$ always resets $c_i$ to 0. A module with the token and any requests uses the medium if $\forall_j<i, c_j<k_j$. After each use of the medium, the module increments all $c_j, j<i$, by 1. If it is no longer requesting the bus or $c_j=k_j$ for some $j<i$, the module passes the token. If the token must be passed, it uses one of two options:

Module $M_i$ always passes the token to module $M_{i+1}$.

(OR)

If $<c_j=0$ for some $j<i$, module $M_i>$ passes the token to module $<M_{jmin}>$, where $j_{min}$: corresponds to the smallest j satisfying this condition. Otherwise, the token is passed to $M_i+1$.

Eliminating the "Count Fields": All the count fields can be eliminated where snooping of all transactions and tokens is possible as on a token-bus. Every module maintains one local count $c_i$ for each module on the bus. The logical operations remain the same: when a module $M_i$ receives the token, all modules reset their local counts for the module to $k_i$. Whenever any module $M_i$ uses the bus, all modules locally increment all $c_j<i$, by 1.

Functional Usage of the Invention

The following assumptions are made about the traffic on the medium. The overhead for passing tokens between modules is relatively small compared to the maximum length of a transaction. The real-time bus traffic to be scheduled on the bus is known a priori. The interface on each module generates a periodic workload that can be modeled as follows. A maximum number of transactions $\tau_i$ is generated every $T_i$ units, where $T_i \leq T_{i+1}$. More formally, if the workload on module i is initiated at time $t_0$, at most $\tau_1$ transactions will be generated each at times $t_0, t_0+T_i, t_0+2T_i,$ ... On a module i, the $\tau_i$ transactions generated at time $\tau_0+n\times T_1$ must be transferred at or within $\tau_0+(n+1)T_i$.

Using a static priority-based scheme called Rate-Monotonic Scheduling disclosed by Sha et al. in the article entitled "Priority Inheritance Protocols: An Approach to Real-Time Synchronization", IEEE transactions on computers, Pages 1175–1178, 9/90 [1], module $M_i$ is guaranteed to meet all its deadlines if $$\frac{p1}{T_1} + \frac{p2}{T_2} \ldots + \frac{pi}{T_1} + \frac{k_i \times P}{T_i} \leq i(2^{1/i} - 1)$$

where $p_j$ is the maximum transfer time of transactions that need to be transferred by module j, $T_j$ is the period of the workload at module j, P is the maximum transfer time of a single transaction, and $k_i$ is the parameter used in the invention. The entire periodic workload is guaranteed to meet all its deadlines if the following condition is met:

$$\frac{p1}{T_1} + \frac{p2}{T_2} \ldots + \frac{pn}{T_n} +$$

$$min\left(\frac{k_1 \times P}{T_1}, \frac{k_2 \times P}{T_2}, \ldots \frac{k_{n-1} \times P}{T_{n-1}}\right) \leq n(2^{1/n} - 1)$$

Reference [1] is hereby incorporated by reference.

Any given workload can be scheduled on a token-passing bus or token-ring with our invention as follows. The token-passing sequence is picked in the order of non-decreasing periods (i.e. descending rate-monotonic priority order). Ties can be broken arbitrarily. The module with the shortest period of the workloads becomes the leader. The medium is scheduled using the invention described. If the above schedulability condition is met, the workload from each module is guaranteed to be transferred. The above inequality is a pessimistic condition and more optimistic conditions can be used.

Under the RMS scheme used above, each module i is assigned a static priority proportional to $$\frac{1}{T_i}.$$

Since the priority is based only upon $$\frac{1}{T_i},$$

this priority assignment scheme can be used even if the values of $\tau_i$'s are unknown. This RMS scheme is the preferred method for initializing the priorities.

The invention ensures that after at most $k_i$ uses of the bus, a module $M_i$ with the highest priority request becomes the bus master. Furthermore, the buffer requirements at every module i is guaranteed to be at most $\tau_i$ The parameters $k_i$ would normally be set the same value k, which can be chosen to make trade-offs between token-passing overhead and better schedulability. When the value of k is 1, for example, the ratio $$\frac{k \times P}{T_1}$$

is small and the traffic on more number of modules can be guaranteed. However, after each use of the bus the token must be transmitted to the leader incurring overhead. For larger values of k, $$\frac{k \times P}{T}$$

is higher. However, the token can be passed in round-robin-like fashion or can be used by a module for consecutive transactions reducing token-passing overhead.

RMS scheme can also be used to schedule non-periodic workloads using approaches like the sporadic server disclosed by Sprunt et al. in the article entitled "Aperiodic Task Scheduling on Hard Real-Time Systems", The Real-Time systems Journal, 6/89.

Having thus described our invention, what we claim as new and desire to secure by Letters Patents is:

1. A method of arbitrating access to a token-based communication medium among a plurality of modules, wherein a token is circulated among said modules on said medium, wherein each of said modules has a limit on the time between a request for transfer of a unit of data and transfer of said unit of data on said medium each of said modules being assigned a priority i, where i is an integer, thus having a plurality of priorities, said method comprising:

a. maintaining a count for each of said modules of a number of units of data transferred by lower priority modules on said medium, thereby generating a plurality of counts each of said modules being assigned a corresponding limit for its said count, where latter said corresponding limit is an integer; and b. transferring at least a unit of data by one of said modules if at least first conditions are satisfied, said first conditions being: said one module has a request to transfer data on said medium said one module has said token, and each count, of said counts, of all of said modules having priority higher than said one module, has not reached latter said corresponding limit.

2. An apparatus for arbitrating access to a token-based communication medium among a plurality of modules, wherein a token is circulated among said modules on said medium, wherein each of said modules has a limit on the time between a request for transfer of a unit of data and transfer of said unit of data on said medium each of said modules being assigned a priority i, where i is an integer, thus having a plurality of priorities, said apparatus comprising:

a. a count register for each of said modules for indicating a number of units of data transferred by lower priority modules on said medium, thereby generating a plurality of counts each of said modules being assigned a corresponding limit for its said count, where latter said corresponding limit is an integer; and b. a logic device for indicating the satisfaction of at least first conditions, said first conditions being: one module has a request to transfer data on said medium, said one module has said token and each count, of said counts, of all of said modules having priority higher than said one module, has not reached latter said corresponding limit.

3. An apparatus for arbitrating access to a token-based communication medium among a plurality of modules, wherein a token is circulated among said modules on said medium, wherein each of said modules has a limit on the time between a request for transfer of a unit of data and transfer of said unit of data on said medium, each of said modules being assigned a priority i, where i is an integer, thus having a plurality of priorities, said apparatus comprising:

a. means for maintaining a count for each of said modules of a number of units of data transferred by lower priority modules on said medium, thereby generating a plurality of counts each of said modules being assigned a corresponding limit for its said count, where said corresponding latter limit is an integer; and b. means for indicating that first conditions are satisfied, said first conditions being: one module has a request to transfer data on said medium, said one module has said token, and each count, of said counts, of all of said modules having priority, of said priorities, higher than said one module, has not reached latter said corresponding limit.

4. A method of arbitrating access to a token-based communication medium among a plurality of modules $M_1, M_2, \ldots, M_n$, wherein a token is circulated among said modules on said medium, wherein each of said modules $M_i$ has a limit on the time between a request for transfer of a unit of data and transfer of said unit of data on said medium each of said modules being assigned a priority i, where i is an integer, thus having a plurality of priorities, said method comprising:

a. maintaining a count $c_i$ for each of said modules $M_i$ of the number of units of data transferred by lower priority modules on said medium, thereby generating a plurality of counts $c_1, c_2, \ldots, c_n$, where each count $c_i$ is initialized to a value $k_i$ and is changed when a module of lower priority, of said priorities, than module $M_i$ transmits a unit of data each of said modules being assigned a corresponding limit for its said count, where latter said corresponding limit is an integer; and b. transferring at least a unit of data by one of said modules if at least first conditions are satisfied, said first conditions being: said one module has said token, and each count of said counts, of all of said modules having priority, of said priorities, higher than said one module, has not reached its said assigned corresponding limit.

5. A method of arbitrating access to a token-based communication medium among a plurality of modules, wherein a token is circulated among said modules on said medium, wherein each of said modules has a limit on the time between a request for transfer of a unit of data and transfer of said unit of data on said medium, each of said modules being assigned a priority i, where i is an integer, thus having a plurality of priorities, a. maintaining a count for each of said modules of a number of uses of said medium by lower priority modules, thereby generating a plurality of counts, each of said modules being assigned a corresponding limit for its said count, where latter said corresponding limit is an integer; and b. using said medium by one of said modules by transferring at least a unit of data by any one of said modules if at least first condition are satisfied, said first conditions being: said one module has a request to transfer data on said medium, said one module has a request to transfer data on said medium, said one module has said token and each count, of all of said modules having priority, of said priorities, higher than said one module, has not reached latter said corresponding limit.

6. An apparatus for arbitrating access to a token-based communication medium among a plurality of modules, wherein a token is circulated among said modules on said medium, wherein each of said modules has a limit on the time between a request for transfer of a unit of data and transfer of said unit of data on said medium, each of said modules being assigned a priority i where i is an integer, thus having a plurality of priorities, said apparatus comprising:

a. a count register for each of said modules for indicating a number of uses of said medium by lower priority modules, thereby generating a plurality of counts, each of said modules being assigned a corresponding limit for its said count, where latter said corresponding limit is an integer;

b. a logic device for indicating the satisfaction of at least first conditions, said first conditions being: one of said modules has a request to transfer data on said medium, said one module has said token, and each count, of said counts, of all of said modules having priority, of said priorities, higher than said one module, has not reach latter said corresponding limit; and c. using said medium by said one module when said first conditions are satisfied for said one module.

7. An apparatus for arbitrating access to a token-based communication medium among a plurality of modules, wherein a token is circulated among said modules on said medium, wherein each of said modules has a limit on the time between a request for transfer of a unit of data and transfer of said unit of data on said medium, each of said modules being assigned a priority i, where i is an integer, thus having a plurality of priorities, said apparatus comprising:

a. means for maintaining a count for each of said modules of a number of uses of said medium by lower priority modules of said modules, thereby generating a plurality of counts;

b. means for indicating that first conditions are satisfied for one of said modules, said first conditions being: said one module has a request to transfer data on said medium, said one module has said token, and each count, of said counts, of all of said modules having priority higher than said one module, has not reached a corresponding limit, where each latter said corresponding limit is an integer; and c. means for using said medium by said one module when said first conditions are satisfied for said one module.

8. A method of arbitrating access to a token-based communication medium among a plurality of modules $M_1, M_2, \ldots, M_n$, wherein a token is circulated among said modules on said medium, wherein each of said modules has a limit on the time between a request for transfer of a unit of data and transfer of said unit of data on said medium, each of said modules $M_i$ being assigned a priority i, where i is an integer and i is a higher priority than i+1, said method comprising:

a. maintaining a count $c_i$ for each of said modules $M_i$ of a number of uses of said medium, by lower priority modules of said modules, thereby generating a plurality of counts $c_i, c_2, \ldots, c_n$, where each count $c_i$ is initialized to a value $k_i$ and is changed when a module of lower priority than module $M_i$ transmits a unit of data; and b. using said medium by one of said modules by transferring at least a unit of data by said one of said modules if at least first conditions are satisfied, said first conditions being: said one module has said token, and each count of said counts, of all of said modules having priority higher than said one module, has not reached a corresponding limit, where each latter said corresponding limit is an integer.

\* \* \* \* \*